United States Patent
Kumano

(10) Patent No.: US 10,771,358 B2
(45) Date of Patent: Sep. 8, 2020

(54) DATA ACQUISITION DEVICE, DATA ACQUISITION METHOD AND STORAGE MEDIUM

(71) Applicant: FUJITSU LIMITED, Kawasaki-shi, Kanagawa (JP)

(72) Inventor: Tatsuo Kumano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 311 days.

(21) Appl. No.: 16/017,159

(22) Filed: Jun. 25, 2018

(65) Prior Publication Data

US 2019/0014016 A1 Jan. 10, 2019

(30) Foreign Application Priority Data

Jul. 4, 2017 (JP) .................. 2017-131098

(51) Int. Cl.
*H04L 12/26* (2006.01)

(52) U.S. Cl.
CPC .......... *H04L 43/022* (2013.01); *H04L 43/024* (2013.01); *H04L 43/0894* (2013.01); *H04L 43/04* (2013.01)

(58) Field of Classification Search
USPC .......................................... 709/224; 711/171
See application file for complete search history.

(56) References Cited

U.S. PATENT DOCUMENTS

| | | |
|---|---|---|
| 2004/0088478 A1 | 5/2004 | Hall |
| 2007/0083650 A1* | 4/2007 | Collomb ............... G06Q 10/04 709/224 |
| 2010/0146227 A1* | 6/2010 | Tsai ...................... G06F 3/0611 711/156 |
| 2010/0199036 A1* | 8/2010 | Siewert ................. G06F 3/0613 711/112 |
| 2012/0030427 A1* | 2/2012 | Hayakawa .......... G06F 12/0866 711/118 |

(Continued)

FOREIGN PATENT DOCUMENTS

| | | |
|---|---|---|
| EP | 2903296 | 8/2015 |
| JP | 2004-152468 | 5/2004 |

(Continued)

*Primary Examiner* — Vivek Srivastava
*Assistant Examiner* — Binod J Kunwar
(74) *Attorney, Agent, or Firm* — Fujitsu Patent Center

(57) ABSTRACT

A non-transitory computer-readable storage medium having stored therein a program, the program executing a process include storing an object that is a unit obtained by sectioning received data by a certain size, the object including a plurality of sessions; calculating a value related to an acquisition time for each of a plurality of data acquisition methods that include a first method that acquires the data in a unit of the session and a second method that acquires the data in a unit of the object; determining the data acquisition method based on the value related to the calculated acquisition time; performing the data acquisition with the determined data acquisition method; periodically acquiring the data with the data acquisition method other than the determined data acquisition method; updating the value related to the acquisition time; and determining the data acquisition method based on the value related to the acquisition time.

15 Claims, 13 Drawing Sheets

(56) References Cited

U.S. PATENT DOCUMENTS

| | | | | |
|---|---|---|---|---|
| 2013/0166614 A1* | 6/2013 | Watanabe | ............ | G06F 16/185 |
| | | | | 707/830 |
| 2014/0115020 A1* | 4/2014 | Colaco | ................ | G06F 19/321 |
| | | | | 707/827 |
| 2014/0164551 A1* | 6/2014 | Resch | ................ | G06F 21/6272 |
| | | | | 709/213 |
| 2015/0177999 A1* | 6/2015 | Gakhal | ................ | G06F 3/0608 |
| | | | | 709/213 |
| 2017/0013004 A1* | 1/2017 | Kim | ................... | H04L 63/1425 |

FOREIGN PATENT DOCUMENTS

| | | |
|---|---|---|
| JP | 2009-169475 | 7/2009 |
| WO | 2014/050040 | 4/2014 |

\* cited by examiner

FIG. 4

| TIME | TRANSMISSION SOURCE ADDRESS | TRANSMISSION SOURCE PORT | DESTINATION ADDRESS | DESTINATION PORT | COMMUNICATION TYPE | OBJECT NAME | OFFSET | SIZE (BYTE) |
|---|---|---|---|---|---|---|---|---|
| 2016-12-27 14:30:00 | 192.168.1.2 | 45861 | 192.168.1.1 | 80 | TCP | A | 0 | 10.680 |
| ... | ... | ... | ... | ... | ... | ... | ... | ... |

FIG. 5

| OBJECT NAME | OFFSET | SIZE (BYTE) |
|---|---|---|
| A | 564,000 | 4,194,304 |
| ... | ... | ... |

FIG. 8

| ACQUISITION METHOD | ACQUISITION TIME OF DATA | TIME |
|---|---|---|
| FIRST METHOD | 2 SECONDS | 2016-12-27 14:30:00 |
| SECOND METHOD | 1 SECOND | 2016-12-27 14:50:00 |
| ... | ... | ... |

FIG. 12

| USER | ACQUISITION METHOD | ACQUISITION TIME OF DATA | TIME |
|---|---|---|---|
| A | FIRST METHOD | 2 SECONDS | 2016-12-27 14:30:00 |
| B | SECOND METHOD | 1 SECOND | 2016-12-27 14:50:00 |
| ... | ... | ... | ... | ns

DATA ACQUISITION DEVICE, DATA ACQUISITION METHOD AND STORAGE MEDIUM

CROSS-REFERENCE TO RELATED APPLICATION

This application is based upon and claims the benefit of priority of the prior Japanese Patent Application No. 2017-131098, filed on Jul. 4, 2017, the entire contents of which are incorporated herein by reference.

FIELD

The embodiment discussed herein is related to a data acquisition device, a data acquisition method, and a storage medium.

BACKGROUND

Conventionally, there has been a packet capture system with which data communicated between a client and an observation target system accessed by the client is captured and stored in a storage device, and at the time of failure investigation or data analysis, the data is acquired from the storage device in accordance with a demand.

As an example of a data acquisition technique, there is a technique of contriving data storage into a single storage medium with a redundant storage mechanism to perform execution order scheduling of access commands with the single storage medium so as to shorten access times.

There is a technique of automatically setting a data acquisition cycle for a data acquisition device to periodically acquire data from each terminal device, without human determination.

There is a technique of acquiring an estimated seek time for a data access operation in a waiting state for the purpose of scheduling data access operations. As related arts, for example, Japanese Laid-open Patent Publication No. 2009-169475, International Publication Pamphlet No. WO 2014/050040, and Japanese Laid-open Patent Publication No. 2004-152468 are disclosed.

In a packet capture system, when a plurality of acquisition methods of data stored in a storage device are present, it is thought that an efficient method is selected by trying each of the plurality of data acquisition methods. However, in this case, each time the contents of the data or the operation conditions of the data acquisition are changed, all the data acquisition methods have to be tried, thereby causing a problem in that the load of the processing for determining the data acquisition method is increased. In view of the above-described matters, it is desirable to be able to easily determine the data acquisition method in accordance with changes in the contents and the operation conditions of the data.

SUMMARY

According to an aspect of the invention, a non-transitory computer-readable storage medium having stored therein a program for acquiring data, the program executing a process include storing an object that is a unit obtained by sectioning received data by a certain size, the object including a plurality of sessions; calculating a value related to an acquisition time for each of a plurality of data acquisition methods that include a first method that acquires the data in a unit of the session and a second method that acquires the data in a unit of the object; determining the data acquisition method based on the value related to the calculated acquisition time; performing the data acquisition with the determined data acquisition method; periodically acquiring the data with the data acquisition method other than the determined data acquisition method; updating the value related to the acquisition time; and determining the data acquisition method based on the value related to the acquisition time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a structure of data related to a session stored in a memory of a capture server;

FIG. 5 is a diagram illustrating an example of a structure of data related to an object stored in the memory of the capture server;

FIG. 8 is a diagram illustrating an example of a structure of data stored in an acquisition time storage unit;

FIG. 12 is a diagram illustrating an example of a case where the structure of data stored in the acquisition time storage unit is set for each user.

DESCRIPTION OF EMBODIMENT

Before the details of the present embodiment are described, a packet capture system will be described.

Figure 1:
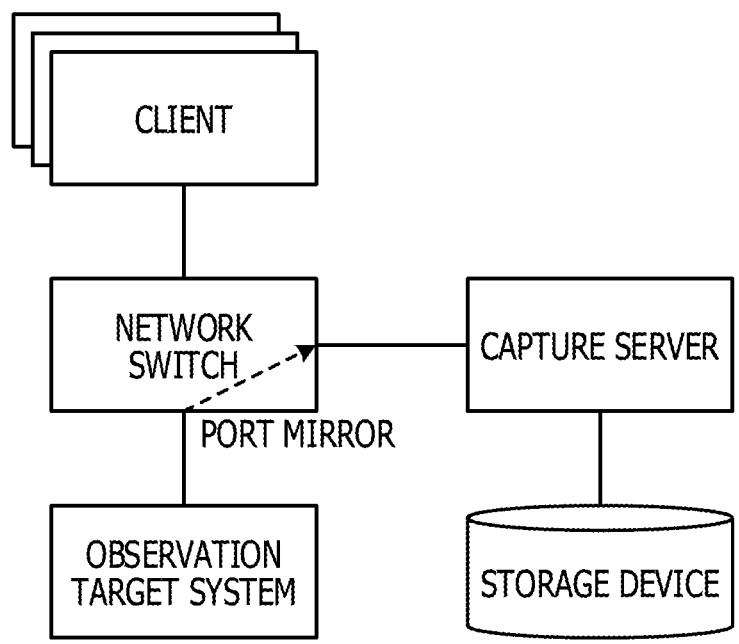
FIG. 1 is a diagram illustrating an example of a packet capture system.
Figure 2:
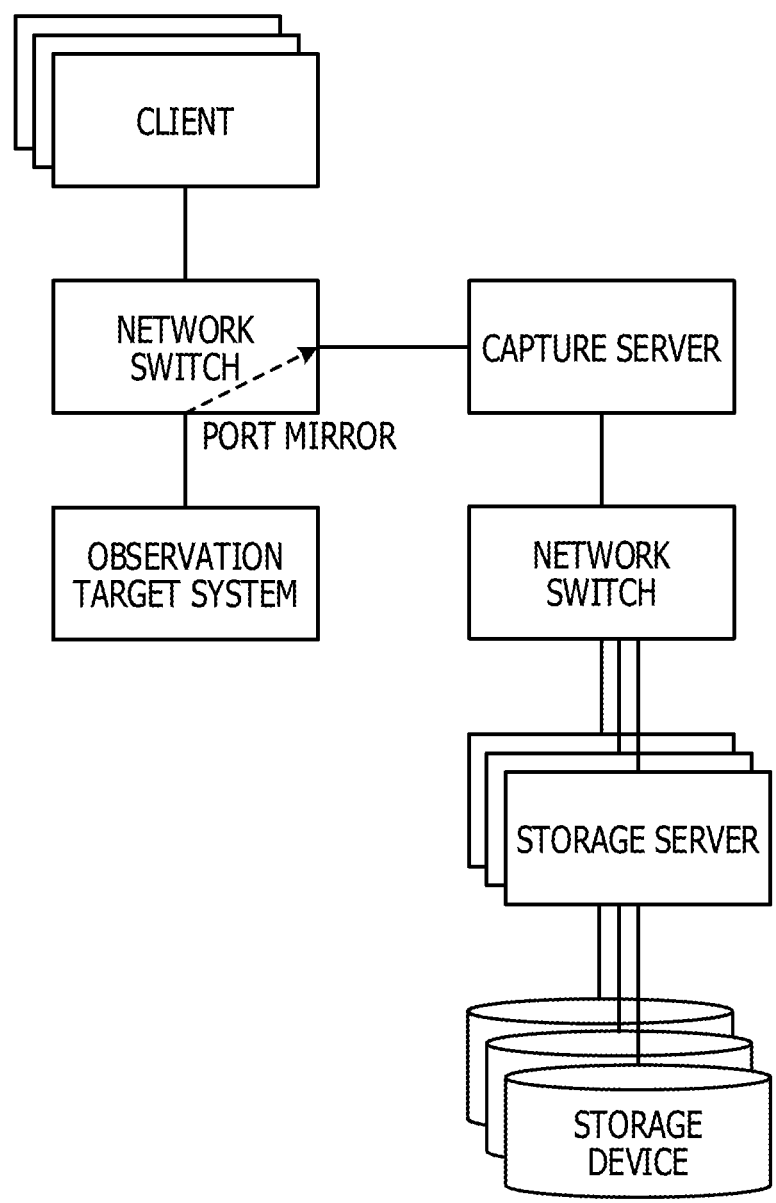
FIG. 2 is a diagram illustrating an example of a case where a storage server is used in the packet capture system.

As illustrated in FIG. 1, a packet capture system causes data running between a client and an observation target system accessed by the client to be port-mirrored via a network switch and stored in a storage device with a capture server. When the flow rate of the network is high, as illustrated in FIG. 2, a plurality of storage servers may be connected from the capture server via the network switch. When the storage server is provided, the data is temporarily cached in the storage server and stored in the storage device via the storage server. This enables the data cached in the storage server to be acquired at a high speed.

The packet capture system as illustrated in FIGS. 1 and 2 has a structure of data in a memory on the capture server and refers to the structure of data to acquire data from a disk in the storage device.

Figure 3:
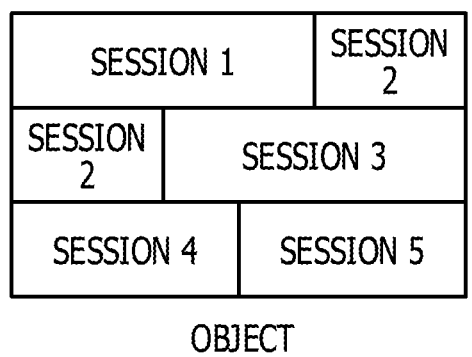
FIG. 3 is a diagram illustrating an example of a structure of data stored in a disk in a storage device.

A structure of data stored in the disk in the storage device in the packet capture system is illustrated in FIG. 3. The data that has been captured is managed in a unit of object obtained by sectioning data into a certain size. The object is structured by pieces obtained by sectioning a plurality of sessions into a certain size, with a session being a unit of packet. A group of packets is stored in a unit of session.

Next, a structure of data related to a session stored in the memory of the capture server is illustrated in FIG. 4. As illustrated in FIG. 4, the capture server stores therein information related to the session stored in the object and information of a reference destination of entity data in the object, as the structure of data related to the session. The information related to the session includes six types, which are a time (a transmission time of a packet, a capture time of a packet, or the like), a transmission source address, a transmission source port, a destination address, a destination port, and a communication type. The information of the reference destination of the entity data in the object includes an object name, an offset (reference destination of the corresponding session in the object), and a size (byte).

Next, a structure of data related to the object stored in the memory of the capture server is illustrated in FIG. 5. As illustrated in FIG. 5, the capture server stores therein information related to the object, as the structure of data related to the object. The information related to the object includes an object name, an offset (logical block addressing (LBA)), and a size (byte).

The packet capture system refers to the structure of data described above and acquires data from the storage device in accordance with a request from a data acquiring client.

Next, an operation on the capture server in the packet capture system will be described.

There are a plurality of data acquisition methods for the capture server to acquire data stored in a disk in the storage device. As major data acquisition methods, two types may be cited, which are a first method that collectively acquires pieces of data in a unit of object and a second method that acquires pieces of data in a unit of session by specifying an object and a session. The data acquiring client specifies one or a plurality of conditions out of the time of the session desired to be acquired, the transmission source address, the transmission source port, the destination address, the destination port, and the communication type and transmits a data acquisition request to the capture server. The capture server acquires pieces of data that satisfy the condition(s) from the storage device. In the case of the first method, the pieces of data are acquired once in a unit of object before the pieces of data for the demanded session are extracted and transmitted to the data acquiring client.

As another data acquisition method, a third method may be cited that acquires pieces of data in a unit of a plurality of consecutive sessions by specifying a plurality of sessions consecutive from an object. Alternatively, data acquisition methods other than the above-described first to third methods are also possible.

However, when pieces of data that satisfy a certain condition are acquired, the most efficient data acquisition method for acquiring the pieces of data out of a plurality of data acquisition methods depends on the contents of the data or the operation conditions of the data acquisition. This makes it difficult to determine the best method. For example, when pieces of data are collectively acquired in a unit of object as in the first method, in a case where only data for some sessions is demanded, there is a problem in that the amount of useless disk accesses is increased. Meanwhile, when pieces of data are acquired in a unit of session as in the second method, in a case where the number of sessions targeted for acquisition is high, there is a problem in that the disk accesses are fragmented, increasing the processing load.

In the packet capture system, data is desirably acquired with an appropriate method in accordance with changes in the contents of the data or in the operation conditions of the data acquisition. For this reason, it is thinkable that when a piece of data with an unknown workload is acquired, the appropriate data acquisition method is selected by trying all the data acquisition methods, for example. However, in this case, each time the contents of the data or the operation conditions of the data acquisition are changed, all the data acquisition methods have to be tried. This takes time and effort. The workload described above means what types of contents the accumulated data has and, from that data, what type of contents is to be acquired. To cite an example of a workload, the accumulated data includes data of web access communication and data of file transfer communication at the ratio of 1:1, and the data of web access communication is acquired from the accumulated data.

When the workload is changed, the currently employed data acquisition method may become inappropriate, lowering the efficiency of the data acquisition, in some cases. The change in the workload means that the ratio between the data of web access communication and the data of file transfer communication is changed from 1:1 to 3:1, or the data acquisition is changed to acquire both the data of web access communication and the data of file transfer communication. For example, a change occurring in the ratio among texts, images, videos, and the like in the data of web access communication is also defined as a change in the workload.

A condition of acquiring data is changed depending on the operation. For this reason, each time a condition of acquiring data is changed, the data acquisition methods have to be tried again to select the efficient method.

In view of the above-described matters, according to the present embodiment, an appropriate data acquisition method in accordance with changes in the contents of data and changes in the operation conditions is easily determined.

Hereinafter, an example of the present embodiment will be described in detail with reference to the drawings.

In the present embodiment, a case where the following first method and second method are used as the data acquisition methods for the capture server will be described as an example. In the description below, the packet capture system is operated with two data acquisition methods of the first method and the second method. However, the packet capture system is similarly operated even with three or more data acquisition methods.

Figure 6:
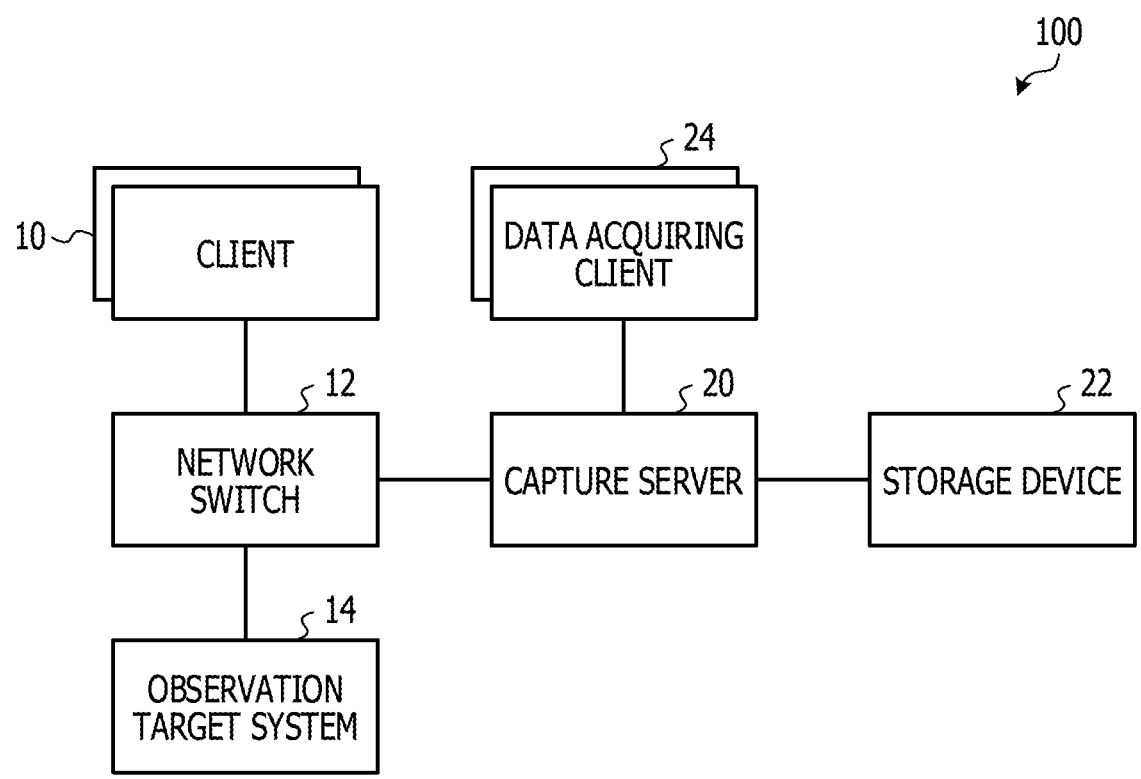
FIG. 6 is a block diagram illustrating a schematic configuration of a packet capture system according to an embodiment of the present disclosure.

As illustrated in FIG. 6, a packet capture system 100 according to the present embodiment includes a client 10, a network switch 12, an observation target system 14, a capture server 20, a storage device 22, and a data acquiring client 24. The client 10 and the observation target system 14 are connected with each other via the network switch 12. The capture server 20 is connected with the network switch 12, the storage device 22, and the data acquiring client 24.

The client 10 is a terminal that accesses the observation target system 14. The client 10 may be achieved by a notebook-type PC, a tablet terminal, or a smartphone, for example.

The network switch 12 mirrors data communicated between the client 10 and the observation target system 14 using a port-mirroring function and transfers the mirrored data to the capture server 20. The data is transferred in a unit of packet. To each packet, information of the session including the time at which the packet is transmitted from the transmission source, the transmission source address, the transmission source port, the destination address, the destination port, and the communication type is given.

The observation target system 14 is a system that performs data communication with the client 10 and thereby provides a service such as a website to the client 10.

The capture server 20 causes the data transferred by port-mirroring to be stored in the storage device 22 in a unit of object. When the data is stored in the storage device 22, the capture server 20 causes the structure of data related to the session illustrated in FIG. 4 described above and the structure of data related to the object illustrated in FIG. 5 described above to be stored in the memory. The capture server 20 receives the data acquisition request including the conditions related to the data to be acquired from the data acquiring client 24. The capture server 20 acquires the data corresponding to the conditions from the storage device 22 based on the data acquisition request, extracts the data as demanded, and returns the extracted data to the data acquiring client 24. Detailed description of the processing performed when the data is stored in the storage device 22 is omitted.

The data acquiring client 24 transmits the data acquisition request to the capture server 20. The data acquisition request is a request by which conditions related to the range of the time, the transmission source address, the destination port, and the like are specified as the conditions related to the data to be acquired, for example.

Figure 7:
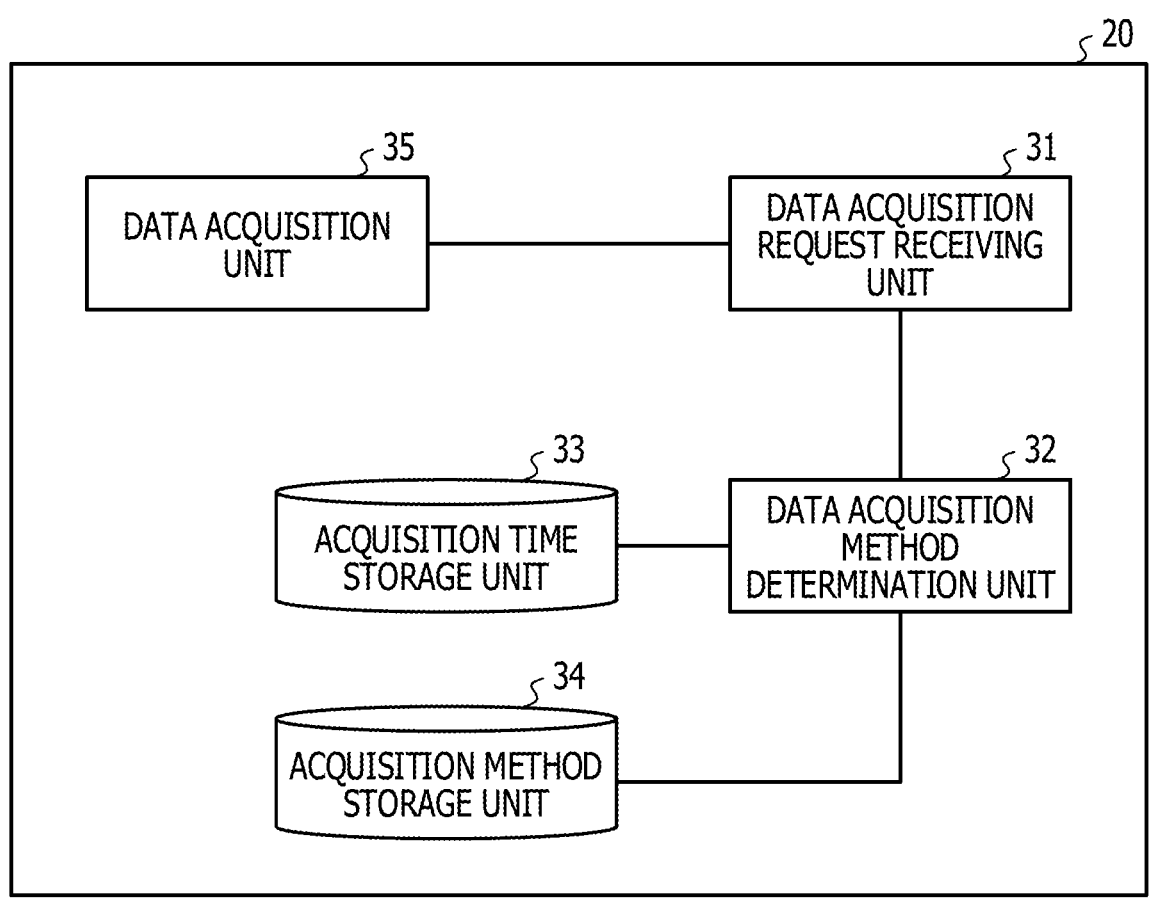
FIG. 7 is a functional block diagram of the capture server.

The capture server 20 functionally includes a data acquisition request receiving unit 31, a data acquisition method determination unit 32, an acquisition time storage unit 33, an acquisition method storage unit 34, and a data acquisition unit 35, as illustrated in FIG. 7.

When the data acquisition request receiving unit 31 has received the data acquisition request from the data acquiring client 24, the data acquisition request receiving unit 31 makes an inquiry to the data acquisition method determination unit 32 about the data acquisition method to determine the data acquisition method. The data acquisition request receiving unit 31 outputs the determined data acquisition method and the data acquisition request to the data acquisition unit 35 and acquires the data acquired from the data acquisition unit 35. Thereafter, the data acquisition request receiving unit 31 extracts data corresponding to the conditions in the data acquisition request from the data acquired from the data acquisition unit 35 and returns the extracted data to the data acquiring client 24. The data acquisition request receiving unit 31 instructs the data acquisition method determination unit 32 to store the acquisition time of the data. The acquisition time of the data described above means the time taken until the data acquisition unit 35 receives all data corresponding to the conditions in the data acquisition request. For example, in the case of acquisition in a unit of session with the second method, the acquisition time of the data means the time taken until data of all sessions corresponding to the conditions in the data acquisition request is received.

When the data acquisition method determination unit 32 has received an inquiry request of the data acquisition method from the data acquisition request receiving unit 31, the data acquisition method determination unit 32 determines whether the data acquisition has been performed for a predetermined number of times after the operation of the data acquisition is started. When the data acquisition has not been performed for the predetermined number of times, the data acquisition method determination unit 32 determines the data acquisition method to be performed this time such that the first method and the second method are performed at the same frequency in the predetermined number of times. For example, the data acquisition method determination unit 32 generates a random number from 0 to 1, and when the number is less than 0.5, determines the first method to be the data acquisition method. On the other hand, when the number is equal to or higher than 0.5, the data acquisition method determination unit 32 determines the second method to be the data acquisition method, and returns the determined data acquisition method to the data acquisition request receiving unit 31.

When the data acquisition has been performed for the predetermined number of times, the data acquisition method determination unit 32 determines the data acquisition method to be performed this time such that the frequency at which the data acquisition method stored in the acquisition method storage unit 34 is performed becomes higher than the frequency at which the other data acquisition method is performed. For example, the data acquisition method determination unit 32 generates a value of the random number from 0 to 1, and when the number is not equal to or higher than a certain value (for example, 0.99), acquires the currently determined data acquisition method from the acquisition method storage unit 34 and returns the acquired data acquisition method to the data acquisition request receiving unit 31. When the value of the generated random number is equal to or higher than the certain value, the data acquisition method determination unit 32 acquires the currently determined data acquisition method from the acquisition method storage unit 34 and returns the data acquisition method that is not the currently determined data acquisition method to the data acquisition request receiving unit 31. In this manner, the data acquisition using the data acquisition method that is not the currently determined data acquisition method is also performed periodically.

The data acquisition method determination unit 32 receives the instruction to store the acquisition time of the data from the data acquisition request receiving unit 31. When the data acquisition method determination unit 32 has received the instruction, the data acquisition method determination unit 32 causes the data acquisition method with which the data acquisition has been performed as well as the acquisition time of the data output from the data acquisition unit 35 and the time at which the data has been acquired to be stored in the acquisition time storage unit 33, and updates the structure of the data in the acquisition time storage unit 33.

The data acquisition method determination unit 32 acquires the acquisition time of the data with each data acquisition method from the acquisition time storage unit 33 at a predetermined timing. Thereafter, the data acquisition method determination unit 32 calculates an average acquisition time for each of the data acquisition methods to determine the current data acquisition method. In this case, the data acquisition method with which the average acquisition time is the shortest is determined as the current data acquisition method. The average acquisition time of the data acquisition method is calculated from the acquisition times of the latest data acquisition (for example, for 100 times). Alternatively, the average acquisition time may be calculated from the acquisition times from a certain time (for example, one month ago) to the current time.

As illustrated in FIG. 8, the acquisition time storage unit 33 stores therein the acquisition time of the data with respect to the data acquisition method with which the data has been acquired and the time at which the data has been acquired as the structure of the data. For example, in the record on the first line, it is stored that the acquisition method is the first method, the acquisition time of the data is 2 seconds, and the time at which the data has been acquired is 2016-12-27 14:30:00.

The acquisition method storage unit 34 stores therein the current data acquisition method determined by the data acquisition method determination unit 32, which is the first method or the second method in the present embodiment.

The data acquisition unit 35 acquires the data corresponding to the conditions included in the data acquisition request from the storage device 22 using the data acquisition method received from the data acquisition request receiving unit 31. Specifically, the data acquisition unit 35 refers to the structure of the data related to the session illustrated in FIG. 4 that is stored in a memory and the structure of the data related to the object illustrated in FIG. 5, and identifies the data corresponding to the conditions included in the data acquisition request. When the data acquisition method is the first method, the data acquisition unit 35 acquires the data corresponding to the conditions included in the data acquisition request in a unit of object from the storage device 22. When the data acquisition method is the second method, the data acquisition unit 35 acquires the data corresponding to the conditions included in the data acquisition request in a unit of session from the storage device 22. The data acquisition unit 35 measures the time taken until the data corresponding to the conditions included in the data acquisition request is acquired from the storage device 22 as the acquisition time of the data, and outputs the measured time to the data acquisition request receiving unit 31.

Figure 9:
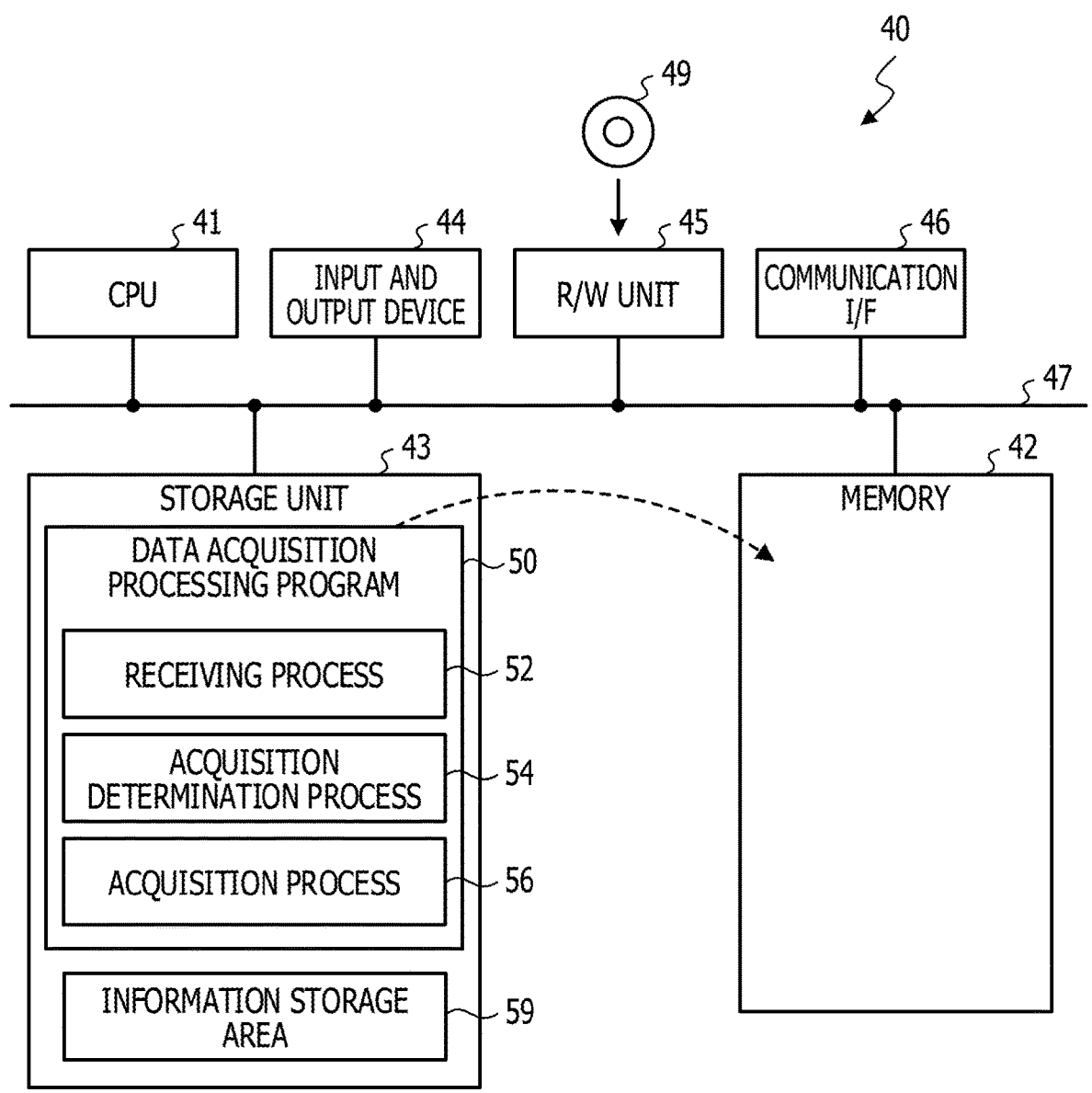
FIG. 9 is a block diagram illustrating a schematic configuration of a computer that functions as a capture server.

The capture server 20 is able to be achieved by a computer 40 illustrated in FIG. 9, for example. The computer 40 includes a central processing unit (CPU) 41, a memory 42 as a temporary storage area, and a non-volatile storage unit 43. The computer 40 includes an input and output device 44, a read/write (R/W) unit 45 that controls reading data from and writing data into a storage medium 49, and a communication interface (I/F) 46 connected to a network such as the Internet. The CPU 41, the memory 42, the storage unit 43, the input and output device 44, the R/W unit 45, and the communication I/F 46 are connected among each other via a bus 47.

The storage unit 43 is able to be achieved by a hard disk drive (HDD), a solid state drive (SSD), a flash memory, or the like. In the storage unit 43 as a storage medium, a data acquisition processing program 50 for causing the computer 40 to function as the capture server 20 is stored. The data acquisition processing program 50 includes a receiving process 52, an acquisition determination process 54, and an acquisition process 56. The storage unit 43 includes the acquisition time storage unit 33 and an information storage area 59 in which information stored in the acquisition method storage unit 34 is retained.

The CPU 41 reads the data acquisition processing program 50 from the storage unit 43 and loads the read data acquisition processing program 50 into the memory 42, and sequentially executes programs included in the data acquisition processing program 50. The CPU 41 performs the receiving process 52, thereby operating as the data acquisition request receiving unit 31 illustrated in FIG. 7. The CPU 41 performs the acquisition determination process 54, thereby operating as the data acquisition method determination unit 32 illustrated in FIG. 7. The CPU 41 executes the acquisition process 56, thereby operating as the data acquisition unit 35 illustrated in FIG. 7. The CPU 41 reads information from the information storage area 59 and loads the contents of the acquisition time storage unit 33 and the acquisition method storage unit 34 into the memory 42. This enables the computer 40 that has executed the data acquisition processing program 50 to function as the capture server 20. The CPU 41 executing the data acquisition processing program 50 is a hardware.

The function achieved by the data acquisition processing program 50 may be achieved by a semiconductor integrated circuit, more specifically, application specific integrated circuit (ASIC), for example.

Figure 10A:
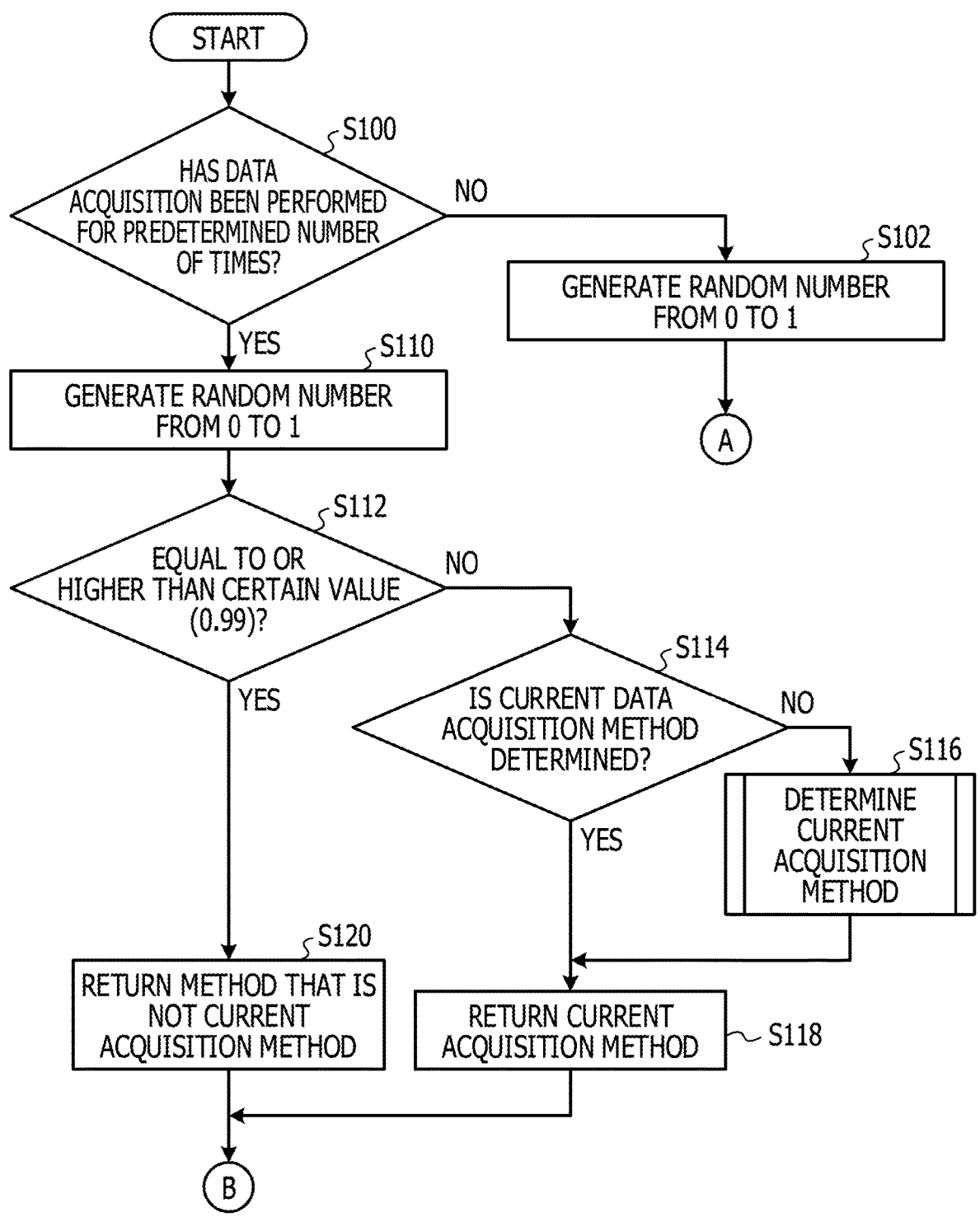
FIGS. 10A and 10B are a flowchart illustrating an example of data acquisition processing.
Figure 10B:
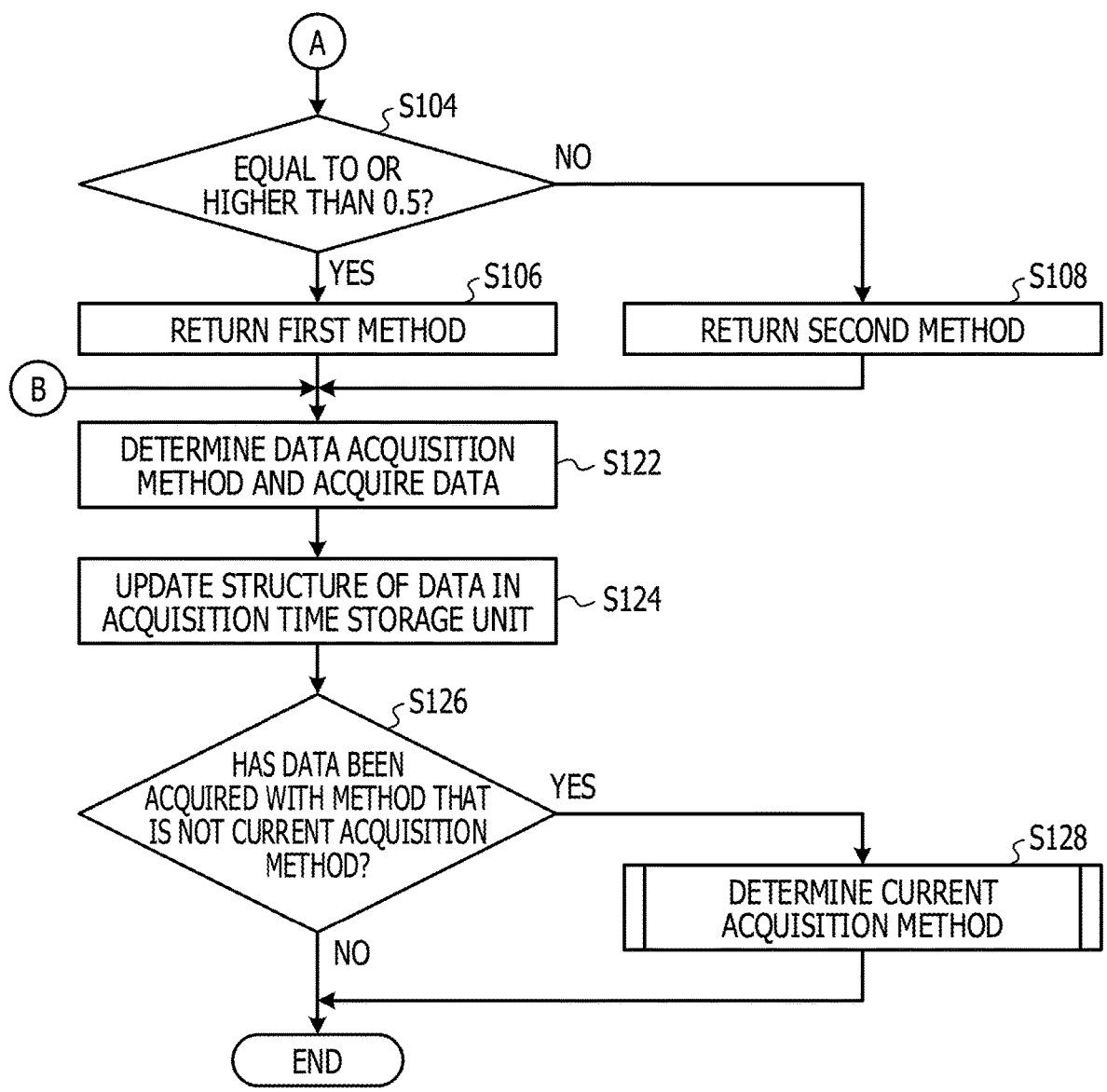

Next, the action of the packet capture system 100 according to the present embodiment will be described. Firstly, with reference to the flowchart in FIGS. 10A and 10B, data acquisition processing will be described. When the data acquisition request receiving unit 31 has received the data acquisition request from the data acquiring client 24, the capture server 20 starts the data acquisition processing.

At S100, the data acquisition method determination unit 32 determines whether the data acquisition has been performed for a predetermined number of times after the operation of the data acquisition is started. As a result of the determination, when the data acquisition has not been performed for the predetermined number of times, the processing moves to S102. On the other hand, when the data acquisition has been performed for the predetermined number of times, the processing moves to S110.

At S102, the data acquisition method determination unit 32 generates a random number from 0 to 1.

At S104, the data acquisition method determination unit 32 determines whether the random number generated at S102 is equal to or higher than 0.5. When the random number is equal to or higher than 0.5, the data acquisition method determination unit 32 determines the first method as the data acquisition method and returns the first method to the data acquisition request receiving unit 31 at S106. When the random number is not equal to or higher than 0.5, the data acquisition method determination unit 32 determines the second method as the data acquisition method and returns the second method to the data acquisition request receiving unit 31 at S108.

At S110, the data acquisition method determination unit 32 generates a random number from 0 to 1.

At S112, the data acquisition method determination unit 32 determines whether the random number generated at S110 is equal to or higher than 0.99. When the random number is not equal to or higher than a certain value, which is 0.99 in this case, the processing moves to S114. When the random number is equal to or higher than 0.99, the processing moves to S120.

At S114, the data acquisition method determination unit 32 determines whether the current data acquisition method has been determined. When the current data acquisition method has been determined, the processing moves to S118. When the current data acquisition method has not been determined, the processing moves to S116.

At S116, the data acquisition method determination unit 32 acquires the acquisition time of the data for each data acquisition method from the acquisition time storage unit 33 and calculates the average acquisition time for each of the data acquisition methods. Thereafter, the data acquisition method determination unit 32 determines the current data acquisition method based on the calculated average acquisition time and causes the determined current data acquisition method to be stored in the acquisition method storage unit 34. The processing then moves to S118.

At S118, the data acquisition method determination unit 32 acquires the currently determined data acquisition method from the acquisition method storage unit 34 and returns the acquired currently determined data acquisition method to the data acquisition request receiving unit 31.

At S120, the data acquisition method determination unit 32 acquires the currently determined data acquisition method from the acquisition method storage unit 34 and returns the data acquisition method that is not the currently determined data acquisition method to the data acquisition request receiving unit 31.

At S122, the data acquisition request receiving unit 31 outputs the determined data acquisition method and the data acquisition request to the data acquisition unit 35. The data acquisition request receiving unit 31 acquires the data corresponding to the conditions included in the data acquisition request that has been acquired by the data acquisition unit 35 and returns the acquired data to the data acquiring client 24. The data acquisition request receiving unit 31 acquires the acquisition time of the data that has been output from the data acquisition unit 35 and instructs the data acquisition method determination unit 32 to store the acquired acquisition time of the data.

At S124, the data acquisition method determination unit 32 causes the data acquisition method with which the data acquisition has been performed as well as the acquisition time of the data and the time at which the data has been acquired to be stored in the acquisition time storage unit 33, and updates the structure of the data in the acquisition time storage unit 33.

At S126, the data acquisition method determination unit 32 determines whether the data acquisition method with which the data acquisition has been performed at S122 is the data acquisition method that is not the currently determined data acquisition method. When the data acquisition method with which the data acquisition has been performed at S122 is the currently determined data acquisition method, the processing is ended. When the data acquisition method with which the data acquisition has been performed at S122 is the data acquisition method that is not the currently determined data acquisition method, the data acquisition method determination unit 32, at S128, uses the structure of the data in the acquisition time storage unit 33 that has been updated to calculate the average acquisition time, determines the current data acquisition method, and ends the processing. This is because in the acquisition time storage unit 33, the acquisition time with respect to the data acquisition method that is not the currently determined data acquisition method has been updated, and thus, when the average acquisition time is recalculated, there is a possibility that the data acquisition method is changed. When the data acquisition has not been performed for the predetermined number of times after the operation of the data acquisition is started, the processing at S126 may be omitted.

Next, the details of the processing performed by the data acquisition method determination unit 32 at S116 and S128 will be described.

Figure 11:
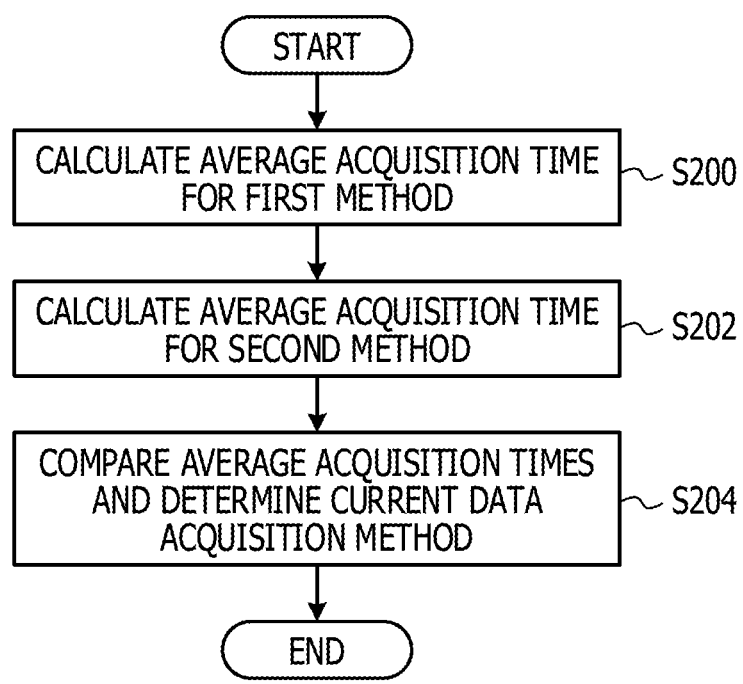
FIG. 11 is a flowchart illustrating an example of data acquisition method determination processing.

As illustrated in FIG. 11, firstly, at S200, the acquisition time of the data with the first method is acquired from the acquisition time storage unit 33 and the average acquisition time for the first method is calculated.

At S202, the acquisition time of the data with the second method is acquired from the acquisition time storage unit 33 and the average acquisition time for the second method is calculated.

At S204, the average acquisition time for the first method calculated at S200 and the average acquisition time for the second method calculated at S204 are compared, and the data acquisition method with which the average acquisition time is shorter is stored in the acquisition method storage unit 34 as the current data acquisition method.

As described above, the packet capture system 100 according to the present embodiment has a plurality of data acquisition methods including the first method that acquires the data in a unit of session and a second method that acquires the data in a unit of object. When there is a data acquisition request, the data acquisition with the plurality of data acquisition methods are performed for a predetermined number of times after the operation of the data acquisition is started. An average acquisition time for each of the data acquisition methods is calculated and, based on the average acquisition time, the data acquisition method is determined. The data is periodically acquired with the data acquisition method other than the determined data acquisition method and the average acquisition time is updated. Based on the updated average acquisition time, the data acquisition method is determined. This enables to determine the acquisition method in accordance with the contents and the operation conditions of the data.

When the operation of the data acquisition is started, with respect to a condition under which the workload is unknown, a plurality of data acquisition methods do not have to be tried for acquiring the data. There is an advantage that the efficiency of the data acquisition is not lowered even when the workload is changed.

In the above-described embodiment, the plurality of data acquisition methods are the first method and the second method. However, the embodiment is not limited thereto. For example, as another data acquisition method, a method may be added that acquires the data in a unit of a plurality of consecutive sessions by specifying a plurality of sessions consecutive in an object or the like. In this manner, the data acquisition method may be determined from three or more data acquisition methods. For example, it is assumed that the data acquisition method is determined from the first to the third methods. In this case, at S104 described above, the first method is determined in the case of 0 to 0.33, the second method is determined in the case of 0.33 to 0.66, and the third method is determined in the case of 0.67 to 1, for example, so that each of the methods is equally selected. At S120 described above, for example, it may be configured such that a random number is generated, and the second method is selected when the random number is equal to or higher than 0.5 and the third method is selected and returned when the random number is less than 0.5.

In the above-described embodiment, when the value of the generated random number is equal to or higher than a certain value, that is, 0.99, the data acquisition is performed with the data acquisition method other than the currently determined data acquisition method. However, the embodiment is not limited thereto. For example, as another embodiment, the certain value may be changed dynamically. This is for the purpose of flexibly corresponding to a change in the workload. For example, as one aspect, when a rapid change in the workload is detected, the certain value is changed to 0.5, and when the random number is equal to or higher than 0.5, the data acquisition is performed with the data acquisition method other than the currently determined data acquisition method. A rapid change in the workload means that the average acquisition capacity of the acquired data is decreased to half or lower or increased to be twice or higher, for example. In such a case, for example, a data acquisition capacity may be additionally stored in the items in the structure of the data in the acquisition time storage unit 33, so that the average acquisition capacity is calculated. A change in the conditions included in the data acquisition request is also defined as a change in the workload. In this case, for example, a condition of the acquired data may be additionally stored in the structure of the data in the acquisition time storage unit 33, so that a condition with a high appearance frequency is obtained and a change in the condition with a high appearance frequency is detected. A condition with a high appearance frequency may be set to 30 appearances out of the latest 100 acquisitions, for example. A change in the condition with a high appearance frequency is a change in which an address port 80 newly appears in the condition with a high appearance frequency, for example.

When the workload is frequently changed, the data acquisition methods determined in the past are stored for a certain number of times (for example, for 100 times) in order to immediately follow the changes. Then, the number of times of change in the data acquisition methods is counted. When the number of times of change is high (for example, 20 times or higher), the certain value is changed, and the frequency of performing the data acquisition with the data acquisition method other than the current data acquisition method may be increased.

When the difference between the average acquisition time with the determined current data acquisition method and the average acquisition time with the data acquisition method other than the determined current data acquisition method is equal to or higher than a preset threshold, it is possible that the frequency of outputting the acquisition method that is not the current acquisition method is decreased. With this, when the difference between the average acquisition times is significantly large (when the average acquisition time with the currently determined method is fast), the number of times of trying the other method is decreased, improving the efficiency of the data acquisition.

A case where a random number is generated to determine which data acquisition method is selected and a plurality of data acquisition methods are performed for a predetermined number of times has been described. However, the embodiment is not limited thereto. For example, a predetermined timing may be preset. As an example, in the case of the above-described S104, each of the data acquisition methods may be set to be performed once. In the case of the above-described S112, the data acquisition method other than the determined data acquisition method may be set to be selected once in 100 times.

In the above-described embodiment, the data acquisition method is determined based on the average acquisition time. However, the embodiment is not limited thereto. For example, an average acquisition speed may be calculated based on the average acquisition time and the average acquisition capacity of the acquired data, and the data may be determined to be acquired with the data acquisition method with which the average acquisition speed is shorter. In this case, a data acquisition capacity may be additionally stored in the items in the structure of the data in the acquisition time storage unit 33. Then, the average acquisition capacity for each of the data acquisition methods may be calculated, so that the average acquisition speed is calculated by dividing the average acquisition capacity by the average acquisition time.

When there are a plurality of data acquiring clients, as illustrated in FIG. 11, a user may be added in the items in the structure of the data in the acquisition time storage unit 33, so that the data acquisition method is determined for each user. In this case, when the data acquisition request is presented by the users, the data acquisition with a plurality of data acquisition methods are performed for each user for a predetermined number of times after the operation of the data acquisition is started. For each user, the average acquisition time for each of the data acquisition methods is calculated, and based on the average acquisition time, the data acquisition method is determined. When the data acquisition method is determined, the data acquisition is performed for each user with the determined data acquisition method. For each user, the data is periodically acquired with the data acquisition method other than the determined data acquisition method, the average acquisition time is updated, and the data acquisition method is determined based on the average acquisition time.

For each condition specified at the time of the data acquisition, the acquisition time may be stored in the acquisition time storage unit 33, so that the average acquisition time is calculated for each condition and the data acquisition method is determined for each condition.

In the above embodiment, a case where the time taken to acquire the data from the storage device is compared among the methods has been described. However, the embodiment is not limited thereto. For example, when a predetermined piece of data is extracted from the acquired data and returned to the data acquiring client in the capture server, the time taken until the data is returned after the data acquisition request is presented, which includes the time for extraction of the data, may be compared. However, out of the time taken until the data is returned after the data acquisition request is presented, the time taken to acquire the data from the storage device occupies a large part, and thus, as in the above embodiment, even only comparing the time taken to acquire the data from the storage device is effective.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium having stored therein a program for acquiring data, the program causing a computer to execute a process comprising:
   storing an object that is a unit obtained by sectioning received data by a certain size, the object including a plurality of sessions;
   calculating a value related to an acquisition time for each of a plurality of data acquisition methods that include a first method that acquires the data in a unit of the session and a second method that acquires the data in a unit of the object;
   determining the data acquisition method based on the value related to the calculated acquisition time;
   performing the data acquisition with the determined data acquisition method;
   periodically acquiring the data with the data acquisition method other than the determined data acquisition method;
   updating the value related to the acquisition time; and
   determining the data acquisition method based on the value related to the acquisition time.

2. The storage medium according to claim 1, wherein the process further comprises when contents of the received data or contents of the acquired data are changed, increasing frequency of periodically performing the data acquisition method other than the determined data acquisition method.

3. The storage medium according to claim 1, wherein the process further comprises storing the determined data acquisition method, counting the number of times for switching the data acquisition method in the determining of the data acquisition method, and when the number of times is equal to or higher than a preset number of times, increasing the frequency of periodically performing the data acquisition method other than the determined data acquisition method.

4. The storage medium according to claim 1, wherein the process further comprises:

comparing the value related to the acquisition time of the data for each of the plurality of the data acquisition method, and when a difference between the value related to the acquisition time for the determined data acquisition method and the value related to the acquisition time for the data acquisition method other than the determined data acquisition method is equal to or higher than a preset threshold, decreasing frequency of periodically acquiring the data with the data acquisition method other than the determined data acquisition method.

5. The storage medium according to claim 1, wherein the value related to the acquisition time is an average acquisition time or an average acquisition speed.

6. The storage medium according to claim 1, wherein the process further comprises:

when a plurality of users present data acquisition requests,
for each of the users, calculating the value related to the acquisition time for each of the plurality of data acquisition methods including the first method that acquires the data in a unit of the session and the second method that acquires the data in a unit of the object, determining the data acquisition method based on the value related to the acquisition time, when the acquisition method of the data is determined, performing the data acquisition with the determined data acquisition method for each of the users, periodically acquiring the data with the data acquisition method other than the determined data acquisition method, for each of the users, updating the value related to the acquisition time, and determining the data acquisition method, based on the value related to the acquisition time.

7. The storage medium according to claim 1, wherein the determining includes selecting the method with the value related to the acquisition time being lower, out of the first method and the second method.

8. A data acquisition device comprising:

a memory that stores an object that is a unit obtained by sectioning received data by a certain size, the object including a plurality of sessions; and a processor coupled to the memory and configured to:
calculate a value related to an acquisition time for each of a plurality of data acquisition methods that include a first method that acquires the data in a unit of the session and a second method that acquires the data in a unit of the object, determine the data acquisition method based on the value related to the calculated acquisition time, perform the data acquisition with the determined data acquisition method, periodically acquire the data with the data acquisition method other than the determined data acquisition method, update the value related to the acquisition time, and determine the data acquisition method based on the value related to the acquisition time.

9. The data acquisition device according to claim 8, wherein the processor is configured to when contents of the received data or contents of the acquired data are changed, increase frequency of periodically performing the data acquisition method other than the determined data acquisition method.

10. The data acquisition device according to claim 8, wherein the processor is configured to:

store the determined data acquisition method, count the number of times for switching the data acquisition method in the determining of the data acquisition method, and when the number of times is equal to or higher than a preset number of times, increase the frequency of periodically performing the data acquisition method other than the determined data acquisition method.

11. The data acquisition device according to claim 8, wherein the processor is configured to:

compare the value related to the acquisition time of the data for each of the plurality of the data acquisition method, and when a difference between the value related to the acquisition time for the determined data acquisition method and the value related to the acquisition time for the data acquisition method other than the determined data acquisition method is equal to or higher than a preset threshold, decrease frequency of periodically acquiring the data with the data acquisition method other than the determined data acquisition method.

12. The data acquisition device according to claim 8, wherein the value related to the acquisition time is an average acquisition time or an average acquisition speed.

13. The data acquisition device according to claim 8, wherein the processor is configured to:

when a plurality of users present data acquisition requests,
for each of the users, calculate the value related to the acquisition time for each of the plurality of data acquisition methods including the first method that acquires the data in a unit of the session and the second method that acquires the data in a unit of the object, determine the data acquisition method based on the value related to the acquisition time, when the acquisition method of the data is determined, performing the data acquisition with the determined data acquisition method for each of the users, periodically acquire the data with the data acquisition method other than the determined data acquisition method, for each of the users, update the value related to the acquisition time, and determine the data acquisition method, based on the value related to the acquisition time.

14. The data acquisition device according to claim 1, wherein the processor is configured to select the method with the value related to the acquisition time being lower, out of the first method and the second method.

15. A data acquisition method performed by a processor of a data acquisition device, the data acquisition method comprising:
- storing an object that is a unit obtained by sectioning received data by a certain size, the object including a plurality of sessions;
- calculating a value related to an acquisition time for each of a plurality of data acquisition methods that include a first method that acquires the data in a unit of the session and a second method that acquires the data in a unit of the object;
- determining the data acquisition method based on the value related to the calculated acquisition time;
- performing the data acquisition with the determined data acquisition method;
- periodically acquiring the data with the data acquisition method other than the determined data acquisition method;
- updating the value related to the acquisition time; and
- determining the data acquisition method based on the value related to the acquisition time.

* * * * *